2,768,271

TITANIUM HELIARC BRAZING PROCESS

Harlan L. Meredith, Norwalk, Calif., assignor to North American Aviation, Inc.

No Drawing. Application October 22, 1953, Serial No. 387,737

15 Claims. (Cl. 219—85)

The instant invention is concerned with a process by which titanium metal may be successfully soldered or brazed. The invention specifically relates to soldering titanium by first brazing a solderable metal on the surface of the titanium.

It is well known that it is extremely difficult to bond or adhere various alloys to a titanium surface due to the very tenacious oxide film formed on the titanium surface, especially at temperatures above 800° F. Even after a titanium surface is mechanically or chemically cleaned by removal of the oxide therefrom the titanium surface immediately begins to form a new oxide film which interferes with any subsequent brazing or soldering of the titanium. The problem is particularly acute when a low temperature or solder bond is desired between two titanium surfaces. A solution for the above difficulties has been sought for some time.

It was with these problems in mind that the instant invention was conceived. The answer appeared to lie in preventing or minimizing the oxide formation on the titanium surface such that a solderable metal could be bonded or adhered to the titanium surface. The solderable metal surfaced titanium could then in turn be soldered or brazed, as desired. It was thus thought to provide a gas-shielded, non-consumable electrode heliarc process of heating to prevent the oxide formation. It was found that the action of the helium arc, in addition to blanketing the area with an inert gas, had the additional function of removing any residual or newly formed oxide film on the titanium surface.

The additional cleaning function of the helium or inert gaseous arc is attributed to the electronic bombardment afforded by the high frequency of the welding transformer which removes volatile impurities, such as oxides, on the reverse cycle of the alternating current. Thus, the heliarc heating process provides an inert gas which blankets the heat affected area protecting it from the detrimental components of the atmosphere, namely, oxygen, nitrogen, hydrogen and moisture, and further provides a continuous cleaning of the surface being treated.

The next problem in bonding a solderable alloy to titanium was the finding of a suitable solderable alloy. The material to be chosen had to be one which is comparatively noble (not readily oxidized) at its melting point, fluid at its melting point, have fair capillary action, and be solderable. The bond that it makes with titanium should be such that it forms a stable intermetallic alloy which is fairly ductile and machineable. It has been found that pure silver meets the above requirements and, further, has the added chemical property of having a high oxygen solubility rating. This solubility is of the order of 200 cc. per 100 grams of silver for oxygen. The above additional property makes silver particularly adaptable for brazing on titanium, since the silver as it becomes molten picks up some of the residual oxides remaining on the titanium surface. These oxides rise up through the silver overlay to the top surface thereof and do not then interfere with the silver-titanium bond.

The instant invention is not limited to the use of a helium arc heating process, since other inert gaseous arcs, such as argon, may be used. Further, the solderable metal brazed on the titanium need not be pure silver, since other materials, such as gold, aluminum, aluminum-silicon or 85–15 silver-manganese, may be used.

It is the principal object of this invention to provide a new process of joining titanium metal to a solderable material.

A further object of this invention is to provide a process of joining titanium metal to a solderable material by the use of an inert gaseous arc.

Another object of this invention is to provide a new process of joining titanium-to-titanium which involves helium arc brazing an overlay of solderable metal on each of the titanium surfaces to be joined.

A still further object includes the provision of removing all the oxide film on a titanium surface by the action of a high-frequency helium arc playing on such surface, whereby a solderable material may then be bonded to said titanium surface.

A further object of this invention is to provide a process of brazing a noble metal overlay on a titanium surface.

Still another object of this invention is to provide a method of pretreating titanium so that such titanium may be soldered or brazed.

Other objects of invention will become apaprent from the following description.

The first step in preparing the titanium surface is to remove the tenacious oxide coating therefrom. This preliminary cleaning may be done by vapor blasting until the metal is bright, followed by a water rinse. The surface may also be cleaned by chemically etching the surface with a 50% $H_3PO_4$ + 50% $H_2O$ solution followed by a water rinse. Another alternative is to mechanically clean the surface with a wire brush or other abrading means. After being cleaned, the titanium immediately begins to form a new protective oxide film. This film, however, is relatively light, and less effort is required to remove it.

The titanium surface is in a condition at this stage to have a solderable metal overlay placed thereover by a special brazing technique. The titanium to be brazed must be in good contact with the welding transformer ground. The current used must be low enough to prevent melting of the titanium when the arc is started. The term "heliarc" is used throughout this disclosure to describe a helium heating arc. It is to be realized that other inert gaseous arcs are usable in this process.

After the arc has been started, the arc is alternatively played on the filler metal and on a portion of the titanium surface in such a manner that the filler metal and titanium metal are brought up to the flowing temperature of the filler metal at the same time. As the filler metal flows onto the arc-treated titanium surface a puddle or pool of filler metal is formed. The arc-treated surface, due to the use of the heliarc heating process, is effectively clean of any oxide film which has formed since the original cleaning step. The filler metal puddle is thus formed on an oxide-free titanium surface.

As the filler metal puddle begins to flow ahead onto the remainder of the titanium surface the arc is moved ahead of such flow to effectively clean the surface ahead of the flowing puddle. The arc is then brought back onto the puddle, more filler metal is added by melting with the helium arc until the filler metal is again ready to flow ahead. This completes one cycle of manipulative technique. These cycles are repeated until the brazed overlay completely covers the titanium surface. At no time should the titanium surface attain a temperature much higher than the flowing temperature of the filler metal.

As stated above, it has been found that pure silver has the suitable prerequisites for use as a filler metal. The heliarc process of heating involves blanketing the area to be heated with an inert gaseous atmosphere. This is preferably done by using an inert gas-shielded, non-consumable electrode with a high frequency alternating current welding transformer.

After the silver or other filler metal overlay has been placed on the titatnium surface any type of solderable material may be soldered thereto using a conventional lead-tin soft solder. In uniting titanium-to-titanium each of the titanium surfaces to be joined is overlaid with a bonded layer of solderable filler metal, such as silver, by the heliarc process. The solderable metals on each of the titanium surfaces are then soldered to each other by conventional soldering means thereby uniting the two titanium surfaces.

The instant process and manipulative steps are such that a sound joint may be formed when soldering or brazing titanium-to-titanium or titanium to a solderable or brazable metal or alloy workpiece. By the use of the instant process and technique a non-ferrous filler metal is able to adhere, bond or alloy with the titanium such that a sound joint is possible. The non-ferrous filler metal is thus compatible with titanium. The results attainable are attributable to the use of the aforesaid inert gaseous arc method of heating and oxide cleaning.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A process of joining titanium-to-titanium comprising the steps of cleaning the surfaces to be joined, inert gaseous arc brazing an overlay of a non-ferrous solderable metal compatible with titanium on said surfaces, and soldering said brazed surfaces.

2. A process of joining titanium comprising the steps of cleaning the surfaces to be joined, inert gas arc brazing an overlay of comparatively noble metal on said surfaces, and soldering said brazed surfaces together.

3. A process of joining titanium comprising the steps of cleaning the surfaces to be joined, helium arc brazing an overlay of silver on said surfaces, and soldering said brazed surfaces together.

4. A process of joining titanium-to-titanium comprising the steps of cleaning the surfaces to be joined, inert gaseous arc brazing an overlay of comparatively noble metal on said surfaces, and soldering said brazed surfaces together.

5. A process of brazing a comparatively noble metal overlay on titanium metal comprising the steps of forming a pool of molten comparatively noble metal on a portion of the titanium surface by an inert gaseous arc after playing said arc on said portion, moving the inert gaseous arc ahead of the molten metal pool to clean the titanium surface and flowing the molten metal onto said clean surface while adding more comparatively noble metal to said pool.

6. A process of helium arc brazing a solderable metal overlay on titanium comprising the steps of playing a helium arc on a portion of the titanium surface, forming a pool of a molten non-ferrous solderable metal compatible with titanium on the portion of the titanium surface by the helium arc, moving the inert helium arc ahead of the solderable metal pool to clean the titanium surface and flowing said molten solderable metal onto said clean surface while adding more solderable metal to said pool.

7. A method of soldering titanium comprising pretreating the titanium surfaces to be joined prior to a soldering operation, said pretreatment comprising the steps of cleaning the surfaces, forming a puddle of molten comparatively noble metal on a portion of said surfaces by an inert gaseous arc, further removing any traces of oxide film from the surface in front of said puddle by movement of the arc thereover prior to the flowing of the puddle, returning said arc to said puddle, adding more comparatively noble metal to said puddle and repeating the last three steps until the surfaces are completely overlaid with said metal.

8. A process of providing a solderable surface on titanium comprising the steps of cleaning the surface of the titanium, bringing the temperature of the titanium surface and a non-ferrous filler metal compatible with titanium up to the flowing temperature of said filler metal by the use of a helium arc, whereby the action of the helium arc removes any oxide film on said surface, forming a pool of molten filler metal on part of said surface by the use of said arc, flowing the molten filler metal onto such oxide-free surface, adding additional filler metal and removing oxide until the filler metal covers the surface to be soldered.

9. A process of providing a solderable surface on titanium comprising the steps of cleaning the surface of the titanium, forming a pool of silver filler metal on part of said surface by the use of a helium arc while bringing the temperature of the titanium surface and the silver filler metal up to the flowing temperature of said silver filler metal by the use of said helium arc, whereby the action of the helium arc removes any oxide film on said surface, flowing the molten silver onto such oxide-free surface, adding additional silver to said surface and removing oxide until the silver covers the surface to be soldered.

10. A process of joining oxide-coated titanium to a solderable metal workpiece comprising the steps of inert gaseous arc brazing a non-ferrous solderable metal filler compatible with titanium on the surface of the titanium after the oxide coating has been removed therefrom, and soldering the solderable metal workpiece to the brazed titanium surface.

11. A process of joining oxide-coated titanium to a solderable metal comprising the steps of removing the oxide coating from said titanium by the action of a high frequency, inert gaseous arc, inert gaseous arc brazing a silver filler on the titanium after the oxide coating has been removed, and soldering the solderable metal to the silver brazed titanium surface.

12. A process of joining oxide-coated titanium to a solderable metal workpiece comprising the steps of helium arc brazing a non-ferrous solderable metal filler compatible with titanium on the surface of the titanium after the oxide coating has been completely removed by the helium arc, said helium arc being formed by a high frequency alternating current, and soldering the solderable metal workpiece to the brazed titanium surface.

13. The method of adhering a non-ferrous solderable metal compatible with titanium to an oxide-coated titanium surface comprising the steps of removing the oxide layer from said surface, bringing the solderable metal to its flowing temperature by means of an inert gas arc while alternately playing said inert gas arc over the titanium surface to further clean said surface and on the solderable metal, and flowing the solderable metal onto the arc-treated titanium surface.

14. The method of adhering a non-ferrous solderable metal compatible with titanium to an oxide-coated titanium surface comprising the steps of removing the oxide layer from said surface, bringing the solderable metal to its flowing temperature by means of a helium arc while alternately playing said helium arc over the titanium surface to further clean said surface and on the solderable metal, and flowing the solderable metal onto the arc-treated titanium surface, said helium arc being formed by a high frequency alternating current.

15. The method of adhering solderable silver to an oxide-coated titanium surface comprising the steps of removing the oxide layer from said surface, bringing the silver to its flowing temperature by means of a helium arc while alternately playing said helium arc on the silver and over the titanium surface to further clean said surface and flow said silver onto the arc-cleaned surface, said helium arc being formed by a high frequency alternating current.

References Cited in the file of this patent

UNITED STATES PATENTS

| | | |
|---|---|---|
| 1,971,822 | Klein | Aug. 28, 1934 |
| 2,360,160 | Pickhaver | Oct. 10, 1944 |
| 2,516,016 | Pakala | July 18, 1950 |
| 2,574,514 | Volff et al. | Nov. 13, 1951 |
| 2,620,422 | Volff | Dec. 2, 1952 |

FOREIGN PATENTS

| | | |
|---|---|---|
| 26,376 | Great Britain | Sept. 1, 1904 |